United States Patent [19]

Buss

[11] Patent Number: 4,507,397
[45] Date of Patent: Mar. 26, 1985

[54] SEMI-CONTINUOUS REGENERATION OF SULFUR-CONTAMINATED CATALYTIC CONVERSION SYSTEMS

[75] Inventor: Waldeen C. Buss, Richmond, Calif.

[73] Assignee: Chevron Research Company, San Francisco, Calif.

[21] Appl. No.: 517,913

[22] Filed: Jul. 28, 1983

[51] Int. Cl.³ .................. B01J 23/96; B01J 21/20; C10G 35/08
[52] U.S. Cl. ..................... 502/38; 208/140; 502/49; 502/52; 502/517
[58] Field of Search .............. 502/38, 49, 52, 517; 208/140

[56]  References Cited
U.S. PATENT DOCUMENTS

| | | | |
|---|---|---|---|
| 2,504,102 | 4/1950 | Sorf | 502/517 |
| 2,892,770 | 6/1959 | Coley et al. | 502/517 |
| 3,046,235 | 7/1962 | King et al. | 502/517 |
| 3,617,523 | 11/1971 | Spurlock | 502/517 |

Primary Examiner—P. E. Konopka
Attorney, Agent, or Firm—Burns, Doane, Swecker & Mathis

[57] ABSTRACT

The process of oxidatively regenerating in situ a fixed bed hydrocarbon catalyst which is sensitive to reactive sulfur compounds in a conversion system having sulfur-contaminated vessels and/or conduits in the flow path upstream from said catalyst is improved by passing regenerating oxygen-containing gas first through the sulfur-contaminated vessels and/or conduits and then through the fixed catalyst bed while limiting the water content of the regenerating gas to a concentration of not more than 0.1 mol percent throughout the flow path and at a temperature in the range of 750°–1100° F. to oxidize the sulfur contaminants in the vessels and/or conduits upstream from the catalyst. Thereby the evolved sulfur oxides flow through the fixed bed catalyst in the absence of sufficient water which would promote reaction of sulfur oxides with the catalyst. The low water content regenerating gas is continued until substantially all the oxidizable sulfur contaminants are removed from the vessels and/or conduits. Thereafter, carbonaceous deposits are oxidized from the catalyst.

25 Claims, 3 Drawing Figures

FIG. 2.

SEMI-CONTINUOUS REGENERATION OF SULFUR-CONTAMINATED CATALYTIC CONVERSION SYSTEMS

FIELD OF THE INVENTION

The present invention relates to the regeneration of hydrocarbon conversion catalysts containing a platinum group component on a porous carrier material, which catalysts have become inactivated by carbonaceous deposits in a fixed bed system having sulfur-contaminated vessels and conduits in the flow path upstream from the catalyst beds. More particularly, it relates to regeneration in situ of catalytic systems in which vessels and conduits upstream from the first bed of catalyst have become contaminated with sulfur-containing deposits (e.g., iron sulfide scale) and the catalysts, such as reforming and dehydrocyclization catalyst are sensitive to sulfur. More especially, it relates to the regeneration of reforming catalysts containing a platinum group component and/or a rhenium component in association with a halogen component on a porous inorganic oxide, such as one containing alumina and/or silica.

The invention has for a particular object a method of regenerating reforming catalysts without significant displacement of the chloride and/or rhenium components by sulfur oxides generated during the regeneration process. An initial regeneration step is carried out in said process that is particularly directed to oxidation of iron sulfide scale on the surface of heat exchangers and furnace tubes upstream from the first bed of catalyst at temperatures, pressures, water concentrations, and flow rates which substantially avoid the simultaneous presence of sulfur oxides and water over the platinum-containing catalyst. Such simultaneous presence is to be avoided since it leads to reaction of the sulfur oxides with the catalyst to form sulfates. In the absence of water, the reaction of sulfur oxides such as sulfur trioxide with aluminum or other catalyst supports and for other catalyst components is minimized. The method is particularly characterized in that no modification of the catalytic reforming process flow circuit is required. Specifically, the heat exchangers and furnace tubes need not be disconnected or isolated from the catalyst bed so that both normal process operations of a catalytic reformer unit and regeneration are carried out without flow circuit modification. In this way, minute quantities of sulfur in the hydrocarbon feed converted to iron sulfide during normal hydrocarbon processing are removed prior to coke removal from the catalyst. After removal of the sulfur, such coke is removed from the deactivated catalyst in a conventional manner by oxidation at temperatures up to about 750° F. −800° F.

In accordance with the present invention, the sulfur in metal sulfide scale on the surfaces of conduits, furnaces or heat exchangers and vessels upstream from the first bed used in catalytic hydrocarbon processing is converted to sulfur oxides without substantial reaction of the sulfur oxides, such as sulfur trioxide, $SO_3$, with the catalyst. Such result is obtained by maintaining the inner walls of the heat exchangers and furnace tubes, where such iron sulfides are present, under conditions which include a substantially lower water concentration than in conventional regeneration and preferably at a temperature from about 750° F. to 1100° F. In this way, substantial water breakthrough into the catalyst beds is avoided while sulfur oxides are still flowing into them from zones in which they are formed by oxidation of metal sulfide scale. Desirably such water concentration of the fluid passing into the catalyst bed is less than about 0.1 mole % and preferably less than about 0.05 mole %. Further, the regeneration gas temperature is preferably substantially higher than the range of about 750° F. to 800° F., which is commonly used for normal regeneration to burn coke from the catalyst particles. In accordance with this invention, such low water concentration in the regenerating gas allows conversion of substantially all iron sulfides to sulfur oxides without significant reaction with the catalyst, because the sulfur oxide gases pass through the catalyst bed without water which promotes such reaction. By first removing these sulfides, the coke can be burned off the catalyst with oxygen at concentrations of about 0.5 mole % or more and temperatures of about 750° F. to 800° F., and then the catalyst may be completely regenerated after the coke burning step by a final step of redispersing the platinum component at temperatures in excess of 900° F., without interference by sulfur oxides. This is particularly important when such redispersion is performed on a platinum-rhenium catalyst and accompanied by halide addition, as in a conventional reforming catalyst. It is also important in a platinum-zeolite catalyst containing an alkaline earth, or alkali, metal component, such as barium or potassium.

BACKGROUND OF THE INVENTION

Catalysts used in hydrocarbon conversion processes such as reforming, dehydrocyclization cracking, isomerization, alkylation, etc., normally become deactivated after a period of catalytic use. It is known to regenerate such catalysts by treating them with an oxygen-containing gas to burn off deactivating substances such as carbon in the form of "coke". "Coke" on catalyst as used herein is meant to refer to the deposit on the catalyst which has a mole ratio of hydrogen to carbon of about one. Regeneration to remove such coke from hydrocarbon conversion catalysts with oxygen has often been performed in situ, i.e., by leaving a bed of catalyst in the reactor in which it had been used for catalytic conversion and passing an oxygen-containing regeneration gas into the reactor and through the catalyst bed to burn the deactivating substances off the catalyst.

Many hydrocarbon conversion systems, particularly naphtha hydroreforming units, employ a process in which the hydrocarbon feed passes in series through two or more separate reactors. Each of the reactors contains at least one bed of catalyst, and each reactor is connected in series to one or more other vessels by large-sized conduits through which the feed is passed. When the hydrocarbon conversion reaction, or reactions, being carried out in a particular system are endothermic, as in reforming, a furnace is normally connected into each of the large feed conduits upstream of each reactor to add required heat to the feed.

In general, hydrocarbon reforming and similar hydrocarbon conversion systems are classified as (1) cyclic, (2) continuous, or (3) semi-continuous. Such classification is based primarily on the different catalyst regeneration methods employed in these systems. In cyclic reforming one of the series of reactors is taken off stream and isolated by means of high temperature valves so that the catalyst therein may be regenerated separately. In continuous reforming, portions of the catalyst are removed from the plant vessels, regenerated in a separate vessel and then returned to the reaction system. During semi-continuous reforming operations, catalyst in all vessels of the entire system is periodically regenerated by passing oxygen-containing gas in series flow through all reactor vessels.

The present invention is primarily directed to regeneration of catalyst in a semi-continuous system, i.e. semi-regenerative reforming, or in situ regeneration, although the principles of sulfur removal from feed lines and heat vessels before coke removal finds application wherever oxygen-containing gas passes through plant internals containing metal sulfides.

During in situ regeneration of a catalyst in plural-reactor-vessel conversion units of a semi-regenerative, reformer system, an oxygen-containing gas is conventionally passed in series flow through all the reactor vessels. The large feed conduits running between the reactors are used to pass the oxygen-containing gas from one reactor vessel to the next. Such flow is also through any heaters or heat exchangers connected in series with the reactors.

Hydrocarbons used as charge stocks for hydrocarbon conversion systems often contain some sulfur compounds. During the on-stream operation of a conversion unit, sulfur in the feed reacts with iron on the surface or in the linings of the conduits, the reactor, furnaces and other vessels, to form iron-sulfide scale. Most of the sulfur reacts with plant internals upstream from the first catalyst bed. To some extent, sulfur may also be deposited directly in catalyst beds during hydrocarbon processing. In semi-continuous catalytic reforming units, sulfur contamination is usually a problem primarily in the furnaces and heat exchangers and interconnecting conduits employed to heat the feed being charged to the first stage reactor.

When a catalyst is regenerated in situ in a unit which has been contaminated with sulfur, oxygen in the regenerating gas reacts with sulfide scale to form sulfur oxides including sulfur dioxide. Some hydrocarbon conversion catalysts, e.g., those containing platinum may in turn catalyze the reaction of sulfur dioxide and oxygen in the regeneration gas, at certain temperatures, to form sulfur trioxide. Sulfur oxides, particularly sulfur trioxide, may then react in the presence of water with alumina in the catalyst to form a sulfate, displacing halide and partially displacing catalytic metals, such as rhenium, and to a lesser extent, platinum. The presence of the sulfate prevents a halide, such as a chloride, from reacting with the alumina surface and thereby impedes redispersion of catalytic metals on the alumina to a form in which the catalyst metals have a highly exposed surface area. Since an effective redispersion of catalytic metals over the alumina surface is essential for proper catalyst regeneration, the presence of sulfates on the catalyst surface during halide addition is undesirable. Moreover, sufficiently high concentrations of sulfate can displace rhenium from the alumina, thereby removing the catalytic benefits that the presence of rhenium imparts to a platinum-on-alumina reforming catalyst. Where the hydrocarbon conversion catalyst is primarily a zeolite such interaction of sulfur oxides with the catalysts may be particularly deleterious to the proper catalyst regeneration during redispersion of the platinum component, with or without chloride.

The disadvantageous results indicated above take place in the presence of water and can be avoided or substantially minimized by using dry regenerating gas and maintaining the catalyst zones substantially dry until the sulfur contaminants are removed from the system. The foregoing postulated mechanism is given by way of explanation only since it is not regarded as necessary for the practice of the present invention.

Chemical cleaning of the whole conversion system effectively removes sulfur from all the vessels, and thus prevents substantial sulfate contamination of catalyst beds, but is costly and time-consuming. The present invention provides an economical and easily performed process for reducing formation of contaminant sulfate in the catalyst bed when the reactor containing the bed is connected to other vessels such as furnaces and reactors by large feed conduits. The present process may also prevent sulfur contamination of downstream catalyst beds, and heaters during successive regenerations or on stream periods following a run in which severe sulfur contamination occurs.

The reasons such downstream contamination of catalyst beds (other than the first bed) may occur is as follows: When a reformer not previously contaminated by large amounts of sulfur is exposed to a major sulfur upset, most of the sulfur tends to react with the internal surfaces of the plant (e.g., feed/effluent heat exchanger, feed furnace) upstream from the first reactor. During the next conventional regeneration, less sulfur is converted into $SO_2$ and flows into the first reactor together with $O_2$. The $SO_2$ is oxidized over the platinum catalyst to $SO_3$, which in the presence of water displaces chloride and rhenium from first reactor catalyst. During the next on stream period, sulfate in the contaminated catalyst is reduced to $H_2S$, which tends to react with hot iron plant internals, especially the next, or first interreactor, furnace. During the next regeneration, sulfide in this furnace is oxidized to $SO_2$ and subsequently to $SO_3$ which in the presence of water displaces chloride and rhenium from the second reactor catalyst, etc.

The present invention is primarily effective for removal of sulfur deposited upstream from the first reactor catalyst. The use of dry regenerating gas during removal of sulfur contaminants and the avoidance thereby of reaction of evolved sulfur oxides with the catalyst is particularly important where as in application Ser. No. 344,570 and Ser. No. 344,572, filed Feb. 1, 1982, assigned to the assignee of the present invention, the catalyst or a portion thereof is a zeolite catalyst having a group VIII metal component, such as platinum and a metal alkaline earth metal component, such as strontium, calcium or barium as a dehydrocyclization enhancing material. The method is also applicable to zeolite catalysts which include an alkali metal component such as potassium. The present regeneration process is especially useful where a second reactor, or a downstream portion of the first reactor, includes such a zeolite catalyst for improved dehydrocyclization of the feed after initial catalytic reforming by passage over a catalyst containing a platinum component, with or without a rhenium component.

It has previously been suggested, as in U.S. Pat. No. 3,137,646 Capsuto, to isolate various heavily sulfur-contaminated elements of a hydrocarbon conversion unit, such as furnace and heat exchanger tubes, before contacting a deactivated catalyst with an oxygen-containing regeneration gas and to purge iron sulfide from the isolated heat exchanger tubes with high-temperature steam and/or an oxygen-containing gas. The freed particles of sulfide scale and/or sulfur dioxide-containing gas are then removed from the system. This type of vessel cleaning requires that several valves or similar apparatus be installed directly into large feed conduits. Such apparatus is expensive and is unnecessary for normal operation of the conversion system and is used solely in relatively infrequent regenerations of the catalyst. This procedure also requires unusually high-temperature conditions.

Other procedures for eliminating sulfide scale from heaters and other sulfur-contaminatable vessels in hydrocarbon conversion units are deficient in that they fail to provide an effective method of preventing deposition of sulfur, as the sulfate, in a catalyst bed during in situ catalyst regeneration, which results in hindering proper redispersion of catalytic metals on an alumina catalyst base.

U.S. Pat. No. 3,716,477 Jacobson et al, assigned to the assignee of the present invention, is generally directed to a reforming operation for naphtha feed through a catalyst comprising platinum and rhenium supported on a porous inorganic oxide carrier in the manufacture of high octane gasoline. It discloses a regeneration process for maintaining catalyst activity which includes passing a gas containing nitrogen and oxygen through the catalyst bed at a temperature that is from about 750° to 1200° F. by maintaining the oxygen content in an amount less than about one volume percent. The patent does not disclose or discuss the problem of sulfur dioxide or sulfur trioxide contamination of the reforming catalyst during subsequent halide addition at high temperatures.

U.S. Pat. No. 4,155,836 Collins et al, is directed to a reforming system using a catalyst which includes a platinum group metal and a halogen. The regeneration process involves decontamination or regeneration of the catalyst when it has been directly contacted by a high sulfur and water content hydrocarbon feed stock. The process includes discontinuing feeding of the contaminating feedstock and passing hydrogen over the contaminated catalyst. Reduction of a platinum on alumina catalyst with hydrogen results in the formation of $H_2S$ in the effluent gas from the catalytic reactor. In the case of a semi-continuous catalytic reformer, this results in sulfiding of the inter-reactor furnace between the first and second reactors. This sulfur can then be transferred to the second reactor catalyst during the next regeneration. This patent does not disclose any process for removing sulfur from the furnace tubes and heat exchangers during regeneration of the catalyst by heating and passing an oxygen containing gas through the furnace tubes and then through the reactor.

U.S. Pat. No. 4,033,898 Jacobson et al, also assigned to the assignee of the present invention, discloses a regeneration system wherein carbonaceous deposits on the catalyst are burned and sulfur is converted to sulfur trioxide which forms sulfates in the catalyst; thereafter the sulfate is removed from the catalyst by hydrogen treatment and the resulting reduced gases are removed.

U.S. Pat. No. 3,773,686 Hayes is directed to a multistep catalyst regeneration process in which during each step it is essential that the gas employed in the regeneration be free of sulfur compounds, and in particular oxides of sulfur and $H_2S$. The method also contemplates the use of water in the conventional burning steps for catalyst reactivation.

To overcome some of the difficulties attendant upon the deposition of sulfide scale on and in the upper portion of a static bed of platinum-group metal catalyst U.S. Pat. No. 2,884,372 Bergstrom discloses submerging foraminous baskets in the upper portion of the static bed of platinum catalyst.

U.S. Pat. No. 2,792,377 Engel shows that oxygen-containing gas may be introduced into the catalyst bed without prior contact with parts of the reactor and feed inlet line and to pass part of the gas back through the forepart of the catalyst bed and the feed inlet line of the reactor and the remainder forward through the catalyst bed without recycling any part of the gas through the catalyst bed.

U.S. Pat. No. 2,873,176 Hengstebeck discloses that difficulties can be avoided by not exposing the sulfide scale in the heater tubes to free oxygen. Hengstebeck teaches to pass inert carrier gas through the heater and to inject sufficient oxygen to produce combustion of the carbonaceous material, usually designated as coke, into the carrier gas between the heater and the reactor.

U.S. Pat. No. 2,923,679 Thomson teaches that the heated oxygen-containing regeneration gases flow through the reforming unit in a direction which is the reverse of the flow of naphtha and hydrogen-containing gas.

While U.S. Pat. No. 3,502,573-Pollitzer describes a catalytic, low pressure reforming process in a substantially water-free reforming zone with controlled additions of sulfur, it indicates that water is present in the regeneration operation and precautions must be taken to insure that the system is substantially free of water after such regeneration and before resuming reforming. This patent is not concerned with the problem of regenerating a catalyst in a system in which the vessels and/or conduits upstream from the catalyst have been contaminated with sulfur-containing deposits.

As contrasted to other systems, the present invention does not depend upon diverting, through additional expensive valves and auxiliary conduits, the sulfur-containing gases resulting from regenerating the catalyst and auxiliary equipment. To desulfurize both auxiliary equipment and catalyst during regeneration of the catalyst, this invention is directed to an improved regeneration method requiring only control of temperature, pressure, rate of flow, and oxygen-content of gas flowing through the reforming unit, including furnaces, connecting conduits and catalyst-containing reactors, first to remove sulfur contaminants from the system and then to remove carbon components from the catalyst before redispersion of platinum and/or rhenium components on the catalyst at high temperatures, with or without addition of halide to the regenerating gases.

SUMMARY OF THE INVENTION

In a preferred embodiment, the present invention relates to improvements in a process for regenerating in situ catalyst in a sulfur contaminated hydrocarbon conversion unit, including the conduits, heat exchangers, furnaces or vessel, without sulfate displacement of catalyst components while carbonaceous deposits are being removed. Such a unit includes a reactor vessel containing a bed of hydrocarbon conversion catalyst (e.g., a Group VIII metal on an alumina carrier) which is sensitive to reactive sulfur compounds in steel processing vessels and conduits, such as heat exchangers or furnace tubes that are connected in series communicate with said reactor. As noted above, the internal surfaces of such steel units upstream of the first catalyst reactor are most likely to be contaminated by sulfide in the normal flow of a hydrocarbon feed stream therethrough. Accordingly, the improvement comprises, first, passing an oxygen-containing gas through the sulfur-contaminated vessels and conduits at a high enough temperature and a low enough water concentration so that sulfur oxides evolved by oxygen interacting with iron sulfide in the steel is not present together with sufficient water to react with the catalyst as the regeneration gas passes through the bed of catalyst in the reactor. In a preferred form, the regenerating gas is maintained dry until the sulfur-oxidation step is substantially finished, as indicated by the sulfur oxide content of the effluent gas. Preferably, the temperature of such gas also is held at above about 800° F. and more preferably above 950° F. Such high temperature (as compared to normal regenerating temperature for the catalyst of 750°–800° F.) promotes conversion of metal sulfide to metal oxide by accelerating the solid state diffusion rate. Further, in a preferred form the pressure of the dry gas is held high and the recycle flow rate of the regenerating gas is held low to decrease the linear gas flow rate and to give more time for the oxygen to react with the metal sulfide. Normally, it will be sufficient to dry the regenerating gas to below 0.1 mol percent of water in the gas entering the catalyst zones from all sources. Desirably, if the effluent gases from the system during this regeneration method are to be recycled the evolved $SO_2$ is separated from the effluent stream, as by soda ash or caustic, to prevent it from reentering the catalyst beds. During the initial phase of the desulfurization step, the oxygen content of the gas entering the reactors is preferably kept low such as less than 0.1 mol percent. After such sulfur decontamination step, the temperature of the gas is decreased to the range of 750°–800° F., and the oxygen concentration is increased to about 0.5 weight percent or more to remove coke from the catalyst. After the coke is substantially removed from the catalyst, as indicated by the disappearance of a temperature rise in each catalyst bed, the regenerating gas temperature is then raised to 900° F. or above and a small amount of a halide is added to assist in redispersing at least the platinum component on the base; such redispersion is facilitated by avoiding displacement of the chloride component from the catalyst by sulfate components left on the catalyst during the decoking step.

The method is particularly characterized in that, first, the dry regenerating gas is supplied at a rate, and at temperatures and concentration to convert efficiently substantially all the metal sulfides to metal oxides, with evolved sulfur oxides passing through the interconnected catalyst bed without generation of sufficient water for the sulfur oxides to react with the catalyst. After the iron sulfides have been substantially removed from the surfaces of the first stage vessel, furnace, heat exchangers or conduits, coke on the catalyst is oxidized to carbon dioxide and water. Thus, such sulfur oxides together with water are not present on the catalyst at the same time so that subsequently the platinum group metals and/or rhenium or like components, may be readily redispersed at higher temperatures, greater than 900° F., with or without addition of a halide component at such a suitably elevated temperature.

The oxygen-containing regenerating gas used to remove the sulfur-containing deposits in the vessels and/or conduits upstream from the catalyst beds, and particularly any gas that may be recycled, is dried by any suitable drying means known in the art, such as a conventional solid adsorbent having a high selectivity for water; for instance, silica gel, activated alumina, calcium or sodium oxides, calcium chloride, aluminosilicates, anhydrous calcium sulfate, high surface area sodium and like absorbents. Also suitable are molecular sieve drying agents, such as calcium aluminosilicate molecular sieves having a port size of about 5 angstroms. In some cases, liquid absorbents (e.g., lithium chloride solutions and ethylene glycol) can be used. Also various combinations of drying agents can be used. Such sulfur removal is continued until $SO_2$ does not appear in the effluent from the vessels and conduits; particularly if no additional $SO_2$ is generated by a rise in temperature of the regenerating gas and the oxygen content of the gas remains constant. Preferably, recycled gas is also treated to remove sulfur compounds such as the sulfur oxides. In some cases, it may be desirable to predry the system by circulation of dry gas such as dry hydrogen, before starting the regeneration step.

Further objects and advantages of the present invention will become apparent from the following detailed description taken in conjunction with the accompanying drawings which form an integral part of the present specification.

Figure 1:
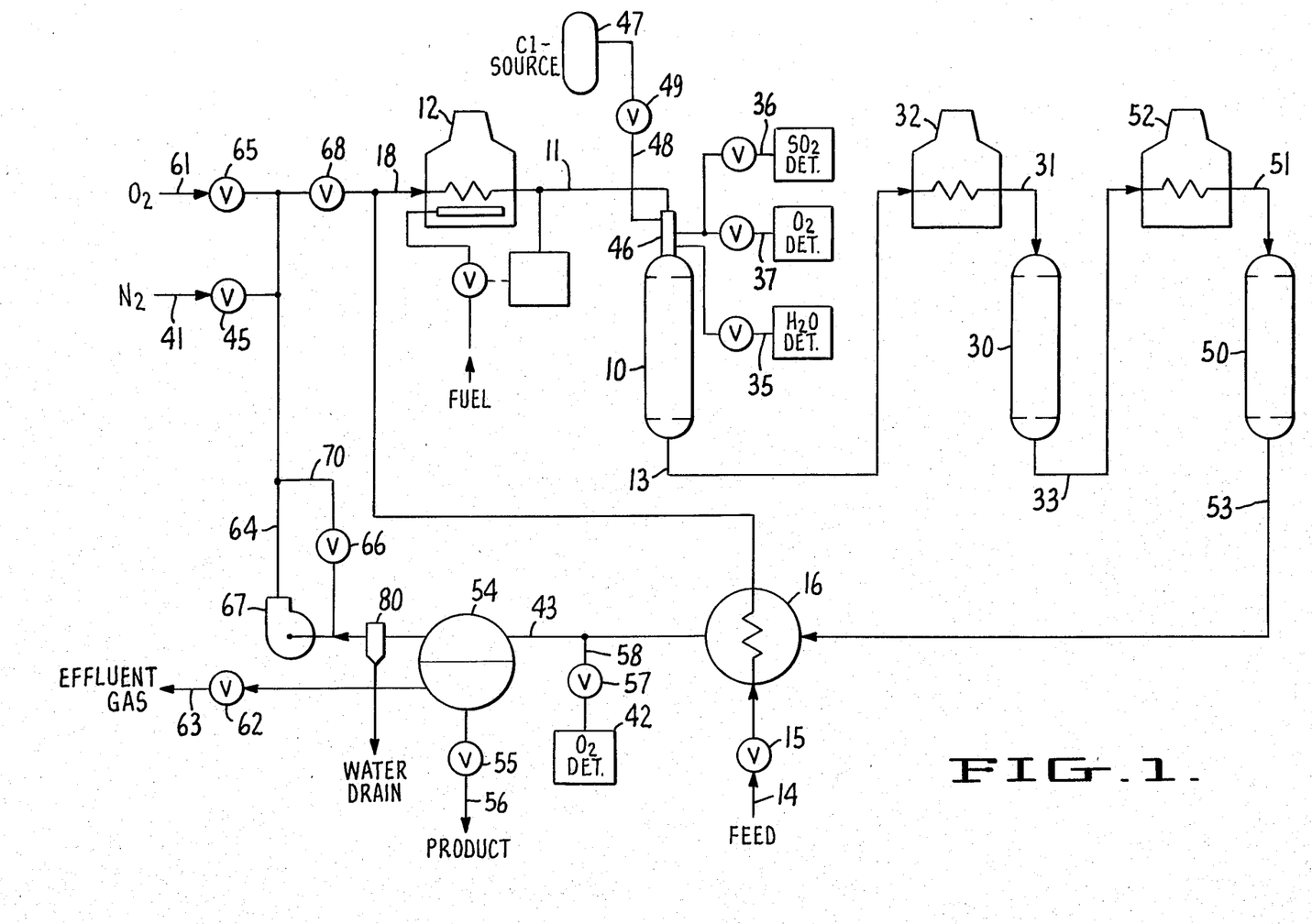
FIG. 1 is a schematic representation of a catalytic hydrocarbon reforming conversion system having a plurality of reactor vessels with furnaces and heat exchangers in series with each other through flow conduits; the components of such a system are subject to the type of carbon and sulfur contamination to which the regeneration method of the present invention may be applied.

Only those elements of a semi-continuous catalytic reforming unit necessary for an understanding of an embodiment of the invention are depicted in the drawing. Other elements included in catalytic reforming units are not shown or described, e.g., compressors, pumps, additional heat exchangers, etc., since their placement and operation in a reforming system, will be readily understood by those skilled in the art.

While the invention is illustrated with reference to platinum-containing reforming catalysts, the invention is also applicable to other catalytic systems in which vessels and conduits upstream from the first bed of catalyst are contaminated by sulfur-containing deposits (e.g., iron sulfide scale) and the catalysts employed in the system are sensitive to contamination by reactive sulphur compounds.

DETAILED DESCRIPTION OF THE INVENTION

Method Embodiments

The present process may appropriately be applied to hydrocarbon conversion systems using catalysts which are sensitive to reactive sulfur components and especially catalyst containing a Group VIII metal component on a porous support or carrier material such as an inorganic oxide. Alumina either alone or mixed with one or more other refractory inorganic oxides, is often used as a carrier for catalytic metals or metal compounds, particularly the Group VIII metals. The Group VIII metals used include especially platinum and iridium, including compounds and mixtures thereof. Platinum, for example, is commonly used in hydrocarbon conversion catalysts, either alone or combined with another Group VIII metal such as iridium, or with such promotor metals as rhenium, tin, germanium, lead, etc. Catalysts containing two or more Group VIII metals and/or other metals, such as rhenium, tin, or the like, are suitable for regeneration by the present process. Catalysts including a Group VIII metal and/or a promotor and alumina are often used in such hydrocarbon conversion processes as reforming, paraffin isomerization, alkyl aromatic isomerization, hydrogenation, dehydrogenation, alkylation and cracking. The present process may be used in hydrocarbon conversion systems for carrying out these or other like processes. Many catalysts which contain a Group VIII metal and alumina also include a halogen component, such as chlorine or fluorine or both. The addition of a halogen component is particularly common in the case of platinum group metal catalysts used in reforming and isomerization. The present process may suitably be employed to regenerate catalysts having a halogen component, preferably a chloride component. Further, the present invention is most particularly applicable to hydrocarbon conversion systems such as catalytic reforming systems, isomerization process systems, etc., in which the processing system includes at least one reactor containing one or more beds of one or more hydrocarbon conversion catalysts, and wherein the catalyst bed to be treated is regenerated in situ in the reactor after the catalyst has become deactivated through use.

The process is further particularly applicable to catalytic hydrocarbon conversion systems using a reforming catalyst having superior activity for dehydrocyclization, especially for treatment of naphthas and gasoline boiling range materials. Included are catalysts such as those comprising a large-pore zeolite, at least one Group VIII metal (preferably platinum or iridium, most preferably platinum), and an alkaline earth metal selected from the group consisting of barium, strontium and calcium (preferably barium) or an alkali metal selected from the group consisting of sodium, lithium, potassium, rubidium and caesium (preferably potassium).

Among the large-pored crystalline zeolites which have been found to be useful are type L zeolite, zeolite X, zeolite Y and faujasite which have apparent pore sizes on the order of 7 to 9 Angstroms.

A composition of type L zeolite, expressed in terms of mole ratios of oxides, may be represented as follows:

$$(0.9-1.3)M_{2/n}O:Al_2O_3(5.2-6.9)SiO_2:yH_2O$$

wherein M designates a cation, n represents the valence of M, and Y may be any value from 0 to about 9. Zeolite L, its x-ray diffraction pattern, its properties, and method for its preparation are described in detail in U.S. Pat. No. 3,216,789. The real formula may vary without changing the crystalline structure; for example, the mole ratio of silicon to aluminum (Si/Al) may vary from 1.0 to 3.5.

The chemical formula for zeolite Y expressed in terms of mole ratios of oxides may be written as:

$$(0.7-1.1)Na_2O:Al_2O_3:xSiO_2:yH_2O$$

wherein x is a value greater than 3 up to about 6 and y may be a value up to about 9. Zeolite Y has a characteristic x-ray powder diffraction pattern which may be employed with the above formula for identification. Zeolite Y is described in more detail in U.S. Pat. No. 3,130,007.

Zeolite X is a synthetic crystalline zeolitic molecular sieve which may be represented by the formula:

$$(0.7-1.1)M_{2/n}O:Al_2O_3(2.0-3.0)SiO_2:yH_2O$$

wherein M represents a metal, particularly alkali and alkaline earth metals, n is the valence of M, and y may have any value up to about 8 depending on the identify of M and the degree of hydration of the crystalline zeolite. Zeolite X, its x-ray diffraction pattern, its properties, and method for its preparation are described in detail in U.S. Pat. No. 2,882,244.

An essential element is use of the alkaline earth, or alkali metal exchanged form of large-pore zeolite. The alkaline earth metal is barium, strontium or calcium, preferably barium. The alkaline earth metal can be incorporated into the zeolite by synthesis or ion exchange. Barium is preferred to the other alkaline earth metals because it results in a somewhat less acidic catalyst. Strong acidity is undesirable in the catalyst because it promotes cracking, resulting in lower selectivity.

In such zeolite catalyst, at least part of the alkali metal, or alkaline earth metal is exchanged with barium, using techniques known for ion exchange of zeolites. This involves contacting the zeolite with a solution containing excess $Ba^{++}$ ions. The barium constitutes from 0.1% to 35% of the weight of the zeolite.

The large-pore zeolitic catalysts are charged with one or more Group VIII metals, w.g., nickel, ruthenium, rhodium, palladium, iridium or platinum.

With type L zeolites, conventionally synthesized in the potassium form, the M cations may be exchanged with other alkali metal ions chosen from the group consisting of potassium, lithium, sodium, rubidium and caesium or combinations thereof. Such zeolite catalysts are disclosed in U.S. Pat. No. 4,904,320.

The preferred Group VIII metals are iridium and particularly platinum, which are more selective with regard to dehydrocyclization and are also more stable under the dehydrocyclization reaction conditions than other Group VIII metals.

The preferred percentage of platinum in the dehydrocyclization catalyst is between 0.1% and 5%, the lower limit corresponding to minimum catalyst activity and the upper limit to maximum activity. This allows for the high price of platinum, which does not justify using a higher quantity of the metal since the result is only a slight improvement in catalyst activity.

Group VIII metals are introduced into the large-pore zeolite by synthesis, impregnation or exchange in an aqueous solution of appropriate salt. When it is desired to introduce two Group VIII metals into the zeolite, the operation may be carried out simultaneously or sequentially.

By way of example, platinum can be introduced by impregnating the zeolite with an aqueous solution of tetra-amineplatinum (II) nitrate, tetraamineplatinum (II) hydroxide, dinitrodiamino-platinum or tetra-amineplatinum (II) chloride. In an ion exchange process, platinum can be introduced by using cationic platinum complexes such as tetraamineplatinum (II) nitrate.

An inorganic oxide may be used as a carrier to bind the large-pore zeolite containing the Group VIII metal and alkali metal or alkaline earth metal, or both. The carrier can be a natural or a synthetically produced inorganic oxide or a combination of inorganic oxides. Typical inorganic oxide supports which can be used include clays, alumina, and silica in which acidic sites are preferably exchanged by cations which do not impart strong acidity (such as Na, K, Rb, Cs, Ca, Sr, or Ba).

These large pore zeolite catalysts can be used as such and in combination with other types of reforming or hydrocarbon conversion catalysts, such as those described in U.S. Pat. No. 3,415,737, either in sequential beds or in admixtures in fixed beds. A particularly effective combination is the sequence of a first bed of a platinum-containing catalyst with an inorganic oxide support such as alumina followed by, in the feed flow stream, a second bed with the above-described large pore zeolite catalyst.

A given reactor normally communicates with other vessels such as furnaces, heat exchangers, other reactor vessels, etc., by way of conduits. Such associated vessels are normally located both upstream and downstream of a particular reactor in a processing system. For example, in a catalytic reforming unit, wherein the reaction is endothermic, an associated furnace is normally located upstream of each reactor and communicates with the reactor by a large conduit through which heated feed is passed to the reactor. In systems with plural reactors in series, for every reactor except the last, another furnace and another reactor are associated with the given reactor at its downstream end by a conduit running between the first reactor and the furnace and between the furnace and the second reactor. Normally part of the gaseous portion of the effluent reaction product is recycled from the last reactor in the series to one of the earlier reactors; generally, the first.

Catalyst beds in hydrocarbon conversion systems can be detrimentally affected by the presence of sulfur in the system. Sulfur is commonly carried into the processing system in the hydrocarbon feedstock. It is usually present in minor amounts except during upsets, when large amounts of sulfur may be introduced. Sulfur contamination of such systems generally results in formation of metal sulfides, e.g. iron sulfide, particularly from reaction of hydrogen sulfide with rust or scale in such conduits, furnaces, heat exchangers, reactor walls and "internals", and the like, through which the heated feed flows prior to entry into the catalyst bed. As noted before, in plants that have not been seriously contaminated by sulfur, most of such sulfur contamination is on the surface of the plant internals upstream from the first reactor. And it is these sulfur compounds which create serious problems during in situ regeneration of catalyst in the reactor beds.

The present process is carried out in connection with oxidative, in situ regeneration of hydrocarbon conversion catalysts and without feed circuit modification. Thus, it is contemplated that normal shutdown and volatile-hydrocarbon purging procedures will have been undertaken prior to carrying out the process of the invention. Accordingly, the hydrocarbon conversion system in which the present process is to be used will be free of hydrocarbon vapors and liquids and will have been purged of volatile, flammable materials by conventional purging of the whole system with an inert gas. Normally, a particular conversion system is isolated from the other systems in a refinery during regeneration by inserting plates into flanges built into the conduits connecting the system to other refinery equipment. This is done before the system to be regenerated is purged of the hydrocarbon vapors.

The first step in carrying out the present process is to contact the feed system, including the conduits, heat exchanger, and furnace tubes without isolation of the reactor, as well as catalyst bed therein, which is to be freed of coke, with a dry regenerative, oxygen-containing gas. In such first step, in accordance with this invention, the amount of water in the gas is not greater then about 0.1 and preferably not more than about 0.05 mole percent and the system is maintained dry until the metal sulfides, upstream from the first reactor are converted from iron sulfide to iron oxide, and the evolved sulfur oxides are removed from the system. The remainder of the regenerating gas is made up of one or more gases which are inert in the particular conversion system, such as nitrogen, argon, steam or carbon dioxide.

The oxygen-containing regenerating gas used to remove the sulfur-containing deposits in the vessels and/or conduits upstream from the catalyst beds is dried by any suitable drying means known to the art such as a conventional solid adsorbent having a high selectivity for water, for instance, silica gel, activated alumina, calcium or sodium oxides, calcium chloride, aluminosilicates, anhydrous calcium sulfate, high surface area sodium and like adsorbents. Also suitable are molecular sieve drying agents, such as calcium aluminosilicate molecular sieves having a pore size of about 5 Angstroms. In some cases, liquid absorbents (e.g., lithium chlorude solutions and ethylene glycol) can be used. Also various combinations of drying agents can be used and different drying agents can be used on the regenerating gas and recycle gas, if any. Preferably, recycled gas is also treated to remove sulfur compounds such as the sulfur oxides. In some cases, it may be desirable to predry the system by circulation of dry gas, such as dry hydrogen, before starting the regeneration step.

The dry oxygen-containing gases pass through the heat exchanger and feed furnace and the effluent therefrom flows into the first bed of hydrocarbon conversion catalyst. Desirably, so long as sulfur oxides are present in the effluent, the water content of the regenerating gas is held sufficiently low so that little or no water is measured in the effluent gas.

The effluent gases should be monitored for content of sulfur oxides and preferably also for water content. If the water content of the effluent gases during the regeneration starts to increase, corrective operations may be taken such as reducing further the water content of the introduced regenerating gas. Reducing the oxygen content of the regenerating gas reduces conversion of coke on the catalyst to water in the system. "Coke" as used herein is meant to refer to the residual hydrocarbon deposit on the catalyst which has a mol ratio of hydrogen to carbon of about one. Other corrrective action may be to discontinue regeneration and purge the system with dry, inert gas, such as dry nitrogen. Desirably, in such first step a temperature of about 750° F. to 1100° F. is maintained to promote solid state diffusion processes within the metal sulfide, thereby leading to substantially complete removal of the sulfur as sulfur oxides without appreciable reaction thereof with the catalyst. Furthermore, the pressure is maintained high and the flow rate low to increase the extent of reaction of the available oxygen with the sulfide.

Following substantially total conversion of the metal sulfides upstream from the first reactor catalyst, as indicated by a decrease in sulfur dioxide content and an increase in the oxygen content of the gas flowing into the reactor, regeneration of the catalyst is carried out under conventional low temperature conditions of not more than about 750° to 800° F. to remove the carbonaceous deposits from the catalyst particles. Such low temperature decoking of the catalyst is highly desirable to avoid potential "hot spots" in the catalyst bed due to the exothermic coke burning reaction. Hot spots, or excessive local temperatures, can result in serious damage to the catalyst particles including removal of the active components from the base. Such regeneration to remove coke is continued until the carbon content of the catalyst is substantially zero, as indicated by a decrease in the temperature rise in each bed due to completion of the exothermic coke-burning process. After such carbon removal, the temperature of the gas is immediately raised to more than 900° F. to redistribute the platinum component on the catalyst. Such elevated temperature is generally accompanied by addition of a halide component. By preliminary removal of sulfur components from the most severely contaminated part of the flow circuit, upstream from the first reactor, such temperatures may be safely used without rapid catalytic conversion of $SO_2$ to $SO_3$ and/or reaction to sulfur oxides with the catalyst that would occur if both $SO_2$ and water were simultaneously present in the catalyst bed.

The oxygen-containing gas, for both the sulfur and carbon removal steps, is preferably contacted with the tubes or pipes and the catalyst bed by a known procedure for circulating an oxygen-containing gas through such a system to burn deactivating materials off the catalyst. The contacting is preferably accomplished by continuously passing a stream of the oxygen-containing gas throughout the internals of the hydrocarbon conversion system, including the reactor containing the catalyst bed. During the sulfur removal step, the sulfur oxide concentration of the effluent gas is monitored to determine the time at which substantially all sulfur has been removed. The sulfur oxides are removed from the effluent gas, and the remaining gas, after redrying to the extent necessary, may be recycled through the plant with dry $O_2$ added to maintain the $O_2$ concentration at the desired level.

After sulfur removal is completed, oxygen flow for decoking is continued until a decrease in catalyst carbon content is evidenced, for example, by the presence of only a small temperature difference between reactor inlet and outlet and/or oxygen in the effluent is constant and $CO_2$ content is substantially zero. After completion of the coke-burning step, the next step is metal redispersion by halide addition. During this step, the catalyst temperature is raised to at least 900° F., $O_2$ content may be increased to at least 1% and then halide is added.

After regeneration, the treating gas is purged from the hydrocarbon conversion system, preferably by purging the reactor and the system in a conventional manner with an inert gas.

Treating the system with dry oxygen-containing gas as described above converts sulfur compounds in the heat exchangers or furnace tubes to sulfur oxides which then pass through the catalyst beds in the absence of significant amounts of water, and therefore, without significant interaction with alumina or other catalyst support and/or other catalyst components to form sulfates in the catalyst. Hence, sulfate materials that would interfere with further regeneration of the catalyst are not present. This is particularly important with a catalyst which contains a halogen component, with or without a promoter metal such as rhenium, in addition to the Group VIII metal and alumina. By this invention, special precautions to handle sulfur oxides in the catalyst bed are not required, such as by costly special valves for external diversion of effluent from the catalyst bed. Further, since little of such sulfur compounds in the catalyst are formed, obviously they need not be removed from the catalyst by subsequent hydrogen treatment.

Apparatus Embodiments

Referring now to the drawings, and in particular to FIG. 1, there is shown a catalytic reforming system suitable for practice of the present invention. It includes a plurality of reforming reactors, vessels 10, 30 and 50. Each reactor contains a bed of reforming catalyst. The particles of such a catalyst bed include a platinum component, with or without a rhenium component, and a chloride component composited with a base of alumina.

Prior to starting the present regeneration process, the catalyst beds in the system have become deactivated by catalytic use, as in reforming a naphtha feedstock, and the reforming system, especially that portion which is upstream of the first catalyst containing reactor, has become sulfur contaminated by contact with sulfur brought into the system in the feed. The system has been shut down and volatile materials have been purged from it in a conventional manner. In shutting down the unit, the feed inlet conduit 14 and the product outlet conduit 56 have been blocked off as by closing valves 15 and 55, respectively, to separate the reforming system from other refinery equipment. Further, nitrogen-containing gas has been passed through the system, as by line 41 through valve 45, at an elevated temperature and removed from the system, as by effluent gas line 63, in order to purge volatiles from the system.

After volatile materials have been purged from the system, a dry oxygen-containing gas is passed into the flow circuit by way of conduit 61 through valves 65 and 68. The dry regenerating gas having less than about 0.1 mole % water is obtained by control of dry inert gas valve 45 in line 41 and dry air or oxygen valve 65 in line 61. Suitable dryers (not shown) can be used with each of such streams or combined with regeneration gas passed through dryer 80. Alternatively, dry gas may be recycled through line 64 by recycle compressor 67. With dry inert gas recycled by compressor 67 the flow rate of inert gas from line 41 may be decreased to any desired extent by controlling the opening of valve 66 in bypass line 70 connected in parallel with compressor 67. The path of the dry oxygen-containing gas is then through the conduit 18, furnace 12 and conduit 11 into first reactor 10.

As indicated schematically, conduit 11 includes an inlet provided, as by tee 46, for adding halide, such as chlorine, from tank 47 through line 48 under control of valve 49. This arrangement is generally used as a final step in regeneration of catalyst in reactor 10. In accordance with this invention, tee 46 may also be used for sampling the regeneration gas effluent in line 11 before entry into first reactor 10 for water vapor, sulfur oxides and oxygen content. These gases are detected and measured through lines 35, 36 and 37 respectively, as indicated. Gas passing through the catalyst bed in reactor 10 is withdrawn through conduit 13. It then flows through second reactor furnace 32 and conduit 31 into the second, or intermediate reactor 30. Gas from such intermediate reactor 30 then flows through conduit 33 to a third, or tail, furnace 52 and then by conduit 51 to third reactor 50. The gas finally flows in line 53 to pass through the shell side of an effluent heat exchanger 16 and then by line 43 to high pressure gas separator 54. The tube side of heat exchanger 16 is connected to inlet feed line 14 through valve 15. Effluent gas is removed through line 63 under control of valve 62. Recycle of gas from separator 54, either during normal reforming operation or regeneration with appropriate clean-up is through line 64, controlled by valves 66 and 68.

In performing the method of the present invention, special valves and conduits, primarily useful only during regeneration of catalyst in reactors 10, 30 and 50, are not required to bypass or short circuit any of the continuous circuit, as above described. Both sulfur components in the steel conduits and vessels and coke on the catalyst are removed exclusively by circulation of the dry oxygen-containing gas through such circuit at the prescribed temperatures and concentrations. However, as discussed above, the problem of disposing of sulfur in such a circuit originates primarily in such reactor elements as furnace 12, and conduit 11. The problem is most acute in the furnace because the temperature of the steel tubes is significantly higher than the conduits and other plant internals and therefore more readily interact with any sulfur in the feed stream. This is due to conversion of iron oxides on the surface of the steel tubing and conduits of these elements to iron sulfide during normal heating and flow of the hydrocarbon feed stock for catalytic conversion in the reforming system. Thus, upon addition of oxygen to this portion of the system during catalyst regeneration, iron sulfide is oxidized to iron oxide and sulfur dioxide is generated in sufficient quantities to have a potentially deleterious effect, if water is present, on the platinum-rhenium catalyst in at least reactor 10. If the water concentration is sufficient in the presence of such catalyst, the so formed significant amounts of sulfur oxides react with and adversely effect the catalyst bed.

Accordingly, the concentration of water in the reforming system is held to a low level so that substantially all sulfur components in the part of the circuit upstream from the first catalyst bed are converted to sulfur oxides, without the presence of water in the catalyst bed, substantially no reaction of the sulfur oxides with the catalyst takes place. Desirably such low concentration of water is maintained at relatively high temperatures and pressures to promote reaction of the available oxygen with metal sulfide.

After such sulfur reduction in the inner surface of the conduits and vessel, the temperature of the regenerated gas is lowered to about 750° F. to 800° F. to burn coke, primarily carbon, from the catalyst particles in reactors 10, 30 and 50. Such burn is conducted by controlling the rate and concentration of oxygen in the gas entering through line 18. Circulation of oxgyen-containing gas is then continued until the catalyst coke burn is essentially complete, as indicated by disappearance of the temperature rise in each catalyst bed and a rise in the oxygen concentration of the effluent gas, which may be measured by oxygen detector 42 sampling effluent line 43 through valve 57 in line 58.

After completion of both the sulfur removal and catalyst decoking steps, the temperature of the system, including each of the reactors 10, 30 and 50, may be raised to assist in redistribution of the platinum components. Accordingly, the temperature is then raised to the 900°–1050° F. range for the final regeneration steps, including any chloride addition from source 47 to assist such platinum redistribution.

Upon completion of regeneration of catalyst, the reforming system may be returned to normal operation by closing valves 45, 65 and 62 and opening both feed line 14 through valve 15 and product outlet valve 55 in product line 56.

Desirably, but not necessarily, the dry oxygen-containing regenerating gas is recirculated during sulfur and carbon components removal, provided, that the water concentration entering the catalyst beds is limited, as indicated above. For this purpose, line 64 supplies recycle gas from recycle compressor 67 to the regeneration system from separator 54 or through bypass line 70, under control of valve 66. As shown, flow of recycled gas to furnace 12 through valve 68 may be continued.

Figure 2:
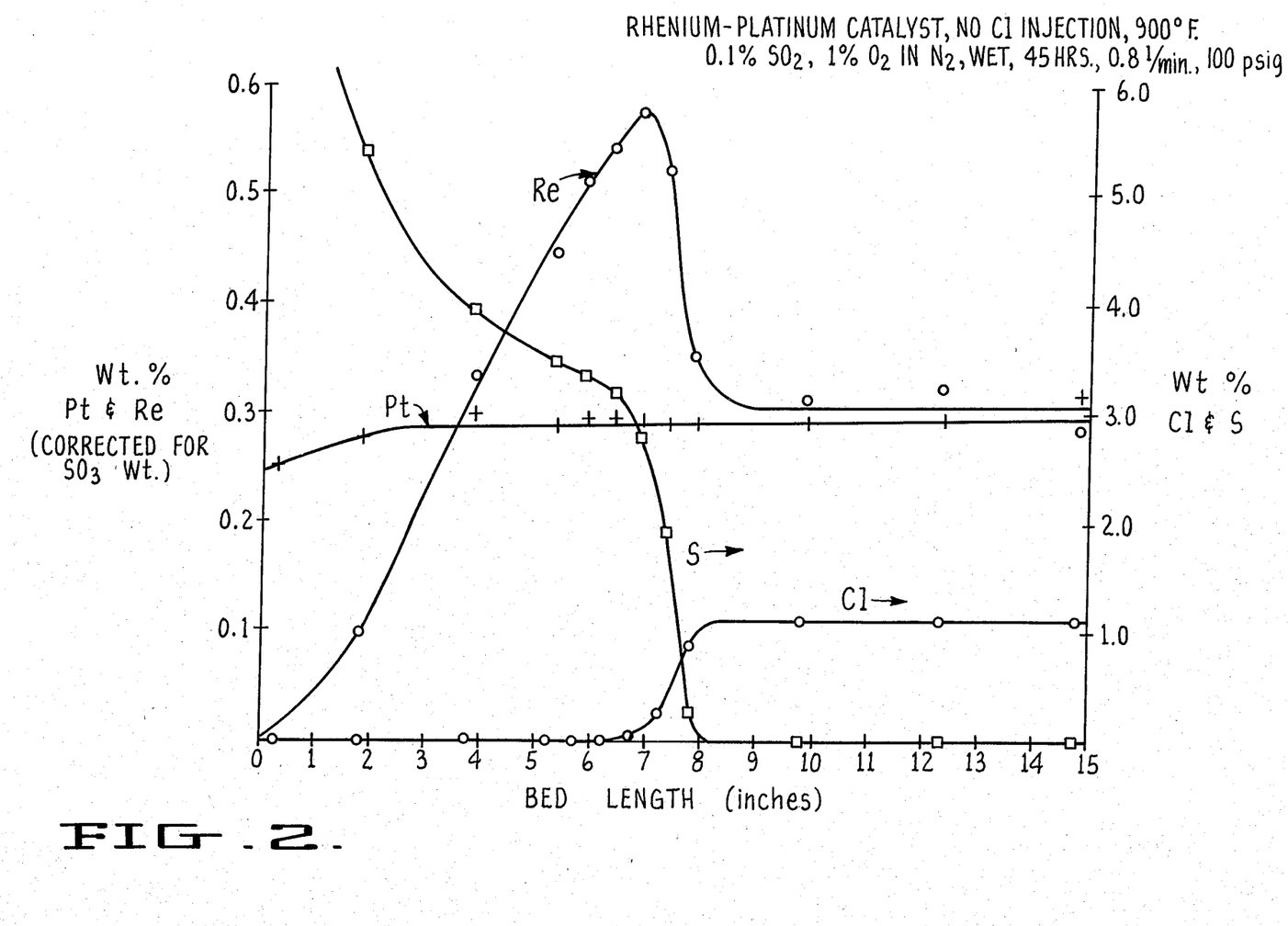
FIg. 2 is a graph of the stripping effect of sulfur oxides on rhenium and chloride components of a reforming catalyst during regeneration of a catalyst bed when the catalyst is simultaneously exposed to $SO_2$, $O_2$ and water at a temperature that would be suitable for redispersion of the metallic components if sulfur and water were not present. The gas was saturated with water at room temperature. This figure shows that chloride is displaced from an alumina based reforming catalyst by sulfate even at fairly low sulfur content. Rhenium is more strongly held by the alumina than is chloride, but is also displaced at higher sulfate content. Platinum is still more strongly bound to the alumina, but begins to be displaced at very high sulfate content.

FIG. 2 illustrates in graphic form the problem that the present invention solves in regenerating a catalytic reforming system of the type described herein. This graph represents an experimental regeneration run through a catalyst sample in which a platinum component, a rhenium component and a chloride component were present on an alumina base.

FIG. 2 shows the effect of regenerating such catalyst in accordance with the prior art where sulfur is present in the form of sulfur oxides and water in the gas entering the catalyst bed under high temperature conditions. A bed length of 15 inches is shown as the abscissa of the graph. The weight percentage of platinum and rhenium are the left hand ordinates and that of chloride and sulfur ions are the right hand ordinates. As indicated, addition of the sulfur component in the form of $SO_2$ in the presence of $O_2$ and water at the given conditions effectively displaces a large percentage of the rhenium component from the catalyst to the right, leaving the catalyst on the left-hand portion of the bed greatly depleted of this component. The peak on the rhenium curve indicates the greatly increased concentration just ahead of the sulfur component in the bed, thereby indicating the deleterious effect of sulfur trioxide and water at such high temperatures. Similarly the sulfate displaces virtually all chloride component from the same portion of the bed.

Figure 3:
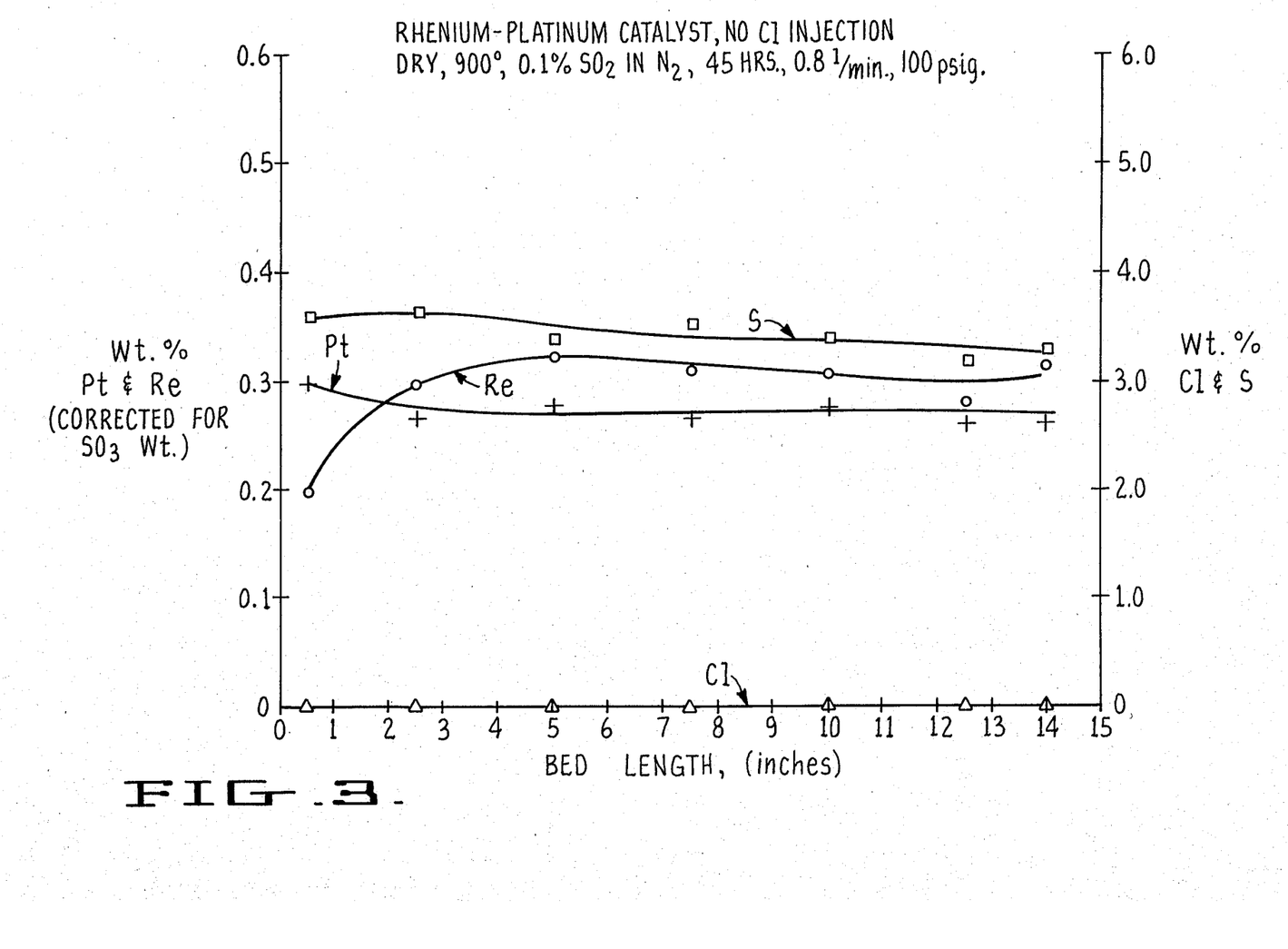
FIG. 3 is a graph of a comparative run to that represented in FIG. 2, without water, showing that the stripping effect of sulfur oxides on rhenium, chloride and platinum are substantially reduced, in accordance with practice of the present invention.

FIG. 3 is a graph illustrating that, as compared to the conditions of a like run shown in FIG. 2, the use of dry regenerating gas avoids any substantial displacement of rhenium, chloride or platinum from the catalyst. Both the chloride and platinum concentration gradient in the catalyst bed (bed length of about 15 inches) was hardly affected and the rhenium was only slightly affected but dramatically less than in the presence of wet gas as in the run shown in FIG. 2.

The flow rate of the dry regenerating gas used in the sulfur removal step depends, as will be apparent to one skilled in the art, on several interrelated factors including the severity of sulfiding in the plant internals, plant feed rate, and the maximum length of time that the plant operator is willing to devote to the sulfur removal step.

While only a few embodiments of the present invention have been described, various modifications or changes can be made in the procedural steps as applied to known processes without departing from the spirit or scope of the present invention. All such modifications or changes coming within the terms of the claims are intended to be included therein.

I claim:

1. In a process of oxidatively regenerating in situ a hydrocarbon conversion catalyst, which catalyst is sensitive to reactive sulfur compounds and which has become contaminated with carbonaceous deposits, in a fixed catalyst bed conversion system having sulfur-contaminated vessels and/or conduits in the flow path upstream from said catalyst bed, which process includes passing a regenerating oxygen-containing gas through said sulfur-contaminated vessels and/or conduits and then through said catalyst to burn off said carbonaceous deposits under controlled conditions, the improvement which comprises passing said regenerating oxygen-containing gas in the flow path first through said sulfur-contaminated vessels and/or conduits and then through said fixed catalyst bed while limiting the water content of said regenerating gas to a concentration of not more than 0.1 mol percent throughout said flow path and oxidizing the sulfur in said contaminated vessels and/or conduits at a temperature in the range of 750°–1100° F. so that the evolved sulfur oxides flowing through said catalyst are in the absence of sufficient water which would promote reaction of sulfur oxides with said catalyst, and continuing the flow of said gas so limited as specified in water content until substantially all the oxidizable sulfur contaminants have been removed from the conversion system.

2. The process of claim 1 wherein the water content of each regenerating gas is limited to less than 0.05 mol percent.

3. The process of claim 1, wherein the initial flow of limited water content gas contains less than 1.0 mol percent oxygen and the temperature during the oxidation and removal of the sulfur contaminants is in excess of 800° F.

4. The process of claim 1 wherein the effluent gases exiting from said conversion system are dried to below a water content of 0.05 mol percent and treated to remove substantially all of the sulfur contaminants therein and the resulting limited water content gas free of sulfur compounds is recycled through the flow path of said conversion system.

5. The process of claim 1 wherein said sulfur sensitive catalyst is a reforming catalyst comprising a platinum group metal on a porous carrier material.

6. The process of claim 5 wherein after said oxidizable sulfur contaminants have been removed from the vessels and/or conduits in the flow path upstream from the catalyst, the temperature of the regenerating gas is lowered to not more than about 800° F. and the carbonaceous deposits are burned off of said catalyst and thereafter the temperature of said gas is increased to at least 900° F. to redistribute the platinum component on said base.

7. The process of claim 1 wherein said catalyst to be regenerated is a reforming catalyst having an alumina base and a rhenium component.

8. The process of claim 1 wherein said catalyst to be regenerated has a metal oxide base and an alkaline earth metal component.

9. The process of claim 8 wherein said alkaline earth metal component is barium.

10. The process of claim 1 wherein said catalyst to be regenerated has a metal oxide base and an alkali metal component.

11. The process of claim 10 wherein said alkali metal component is potassium.

12. The process of claim 1 wherein the pressure of said oxygen-containing gas is maintained sufficiently high so that during said removal of sulfur contaminants rapid conversion to sulfur dioxide is promoted.

13. The process of claim 1 wherein said catalyst to be regenerated is a reforming catalyst comprising a large-pore zeolite containing at least one Group VIII metal.

14. The process of claim 13 wherein said large-pore zeolite has an apparent pore size of from 7 to 9 Angstroms.

15. The process of claim 13 wherein said large-pore zeolite is selected from the group consisting of type L zeolite, zeolite X, zeolite Y and faujasite.

16. The process of claim 15 wherein said large-pore zeolite is a type L zeolite.

17. The process of claim 13 wherein said Group VIII metal is platinum.

18. The process of claim 17 wherein said catalyst comprises:

(a) a large-pore zeolite containing platinum; and
(b) an inorganic binder.

19. The process of claim 18 wherein said inorganic binder is selected from the group consisting of clays, alumina, and silica.

20. The process of claim 13 wherein said catalyst contains an alkaline earth metal selected from the group consisting of barium, strontium, and calcium.

21. The process of claim 20 wherein said catalyst has from 0.1% to 35% by weight barium and from 0.1% to 5.0% by weight platinum.

22. In a process of oxidatively regenerating in situ a hydrocarbon conversion catalyst, which catalyst is sensitive to reactive sulfur compounds and which has become contaminated with carbonaceous deposits, in a fixed catalyst bed conversion system having sulfur-contaminated vessels and/or conduits in the flow path upstream from said catalyst bed, the improvement which comprises passing a regenerating oxygen-containing gas in the flow path first through said sulfur-contaminated vessels and/or conduits and then through said fixed catalyst bed while limiting the water content of said regenerating gas to a concentration of not more than 0.1 mol percent throughout said flow path and oxidizing the sulfur contaminants in said vessels and/or conduits at a temperature in the range of 750°–1100° F. so that the evolved sulfur oxides flowing through said fixed bed catalyst are in the absence of sufficient water which would promote reaction of sulfur oxides with said catalyst, continuing the flow of said gas so limited in water content until substantially all the oxidizable sulfur contaminants have been removed from the conversion system, and thereafter oxidizing the carbonaceous deposits on said catalyst.

23. The process of claim 22 wherein the water content of said regenerating gas is limited to less than 0.05 mol present.

24. The process of claim 22 wherein the effluent gases exiting from said reactor are treated to remove substantially all water and sulfur contaminants therein and the resulting sulfur-free, dry gases are recycled through said vessels and/or conduits and said catalyst bed.

25. In a process of oxidatively regenerating in situ a hydrocarbon conversion catalyst which catalyst is sensitive to reactive sulfur compounds and which has become contaminated with carbonaceous deposits, in a fixed catalyst bed conversion system having sulfur-contaminated vessels and/or conduits in the flow path upstream from said catalyst bed and wherein oxygen-containing gas is circulated through said catalyst having an alumina base and including a platinum component and a rhenium component and said gas oxidizes the carbonaceous deposits on said catalyst at a temperature of about 750° F. and after the carbon content of said catalyst has been substantially reduced said gas is circulated through said catalyst bed at a temperature of above 900° F. to facilitate redispersion of said platinum component over the alumina surface of said catalyst, the improvement comprising passing said regenerating oxygen-containing gas first through said sulfur-contaminated vessels and/or conduits and then through said fixed catalyst bed while limiting the water content of said regenerating gas to a concentration at less than 0.1 mol percent and at a temperature in excess of 750° F. at the inner surface of said conduit and continuing said gas circulation to reduce sulfur contamination of said vessels and/or conduits until the sulfur content of the effluent gas is substantially reduced and whereby sulfur contamination of said catalyst is prevented prior to said carbonaceous deposit removal step.

* * * * *